Nov. 9, 1971  A. A. LIPTON  3,618,379
TENSIOMETER
Filed Oct. 31, 1969
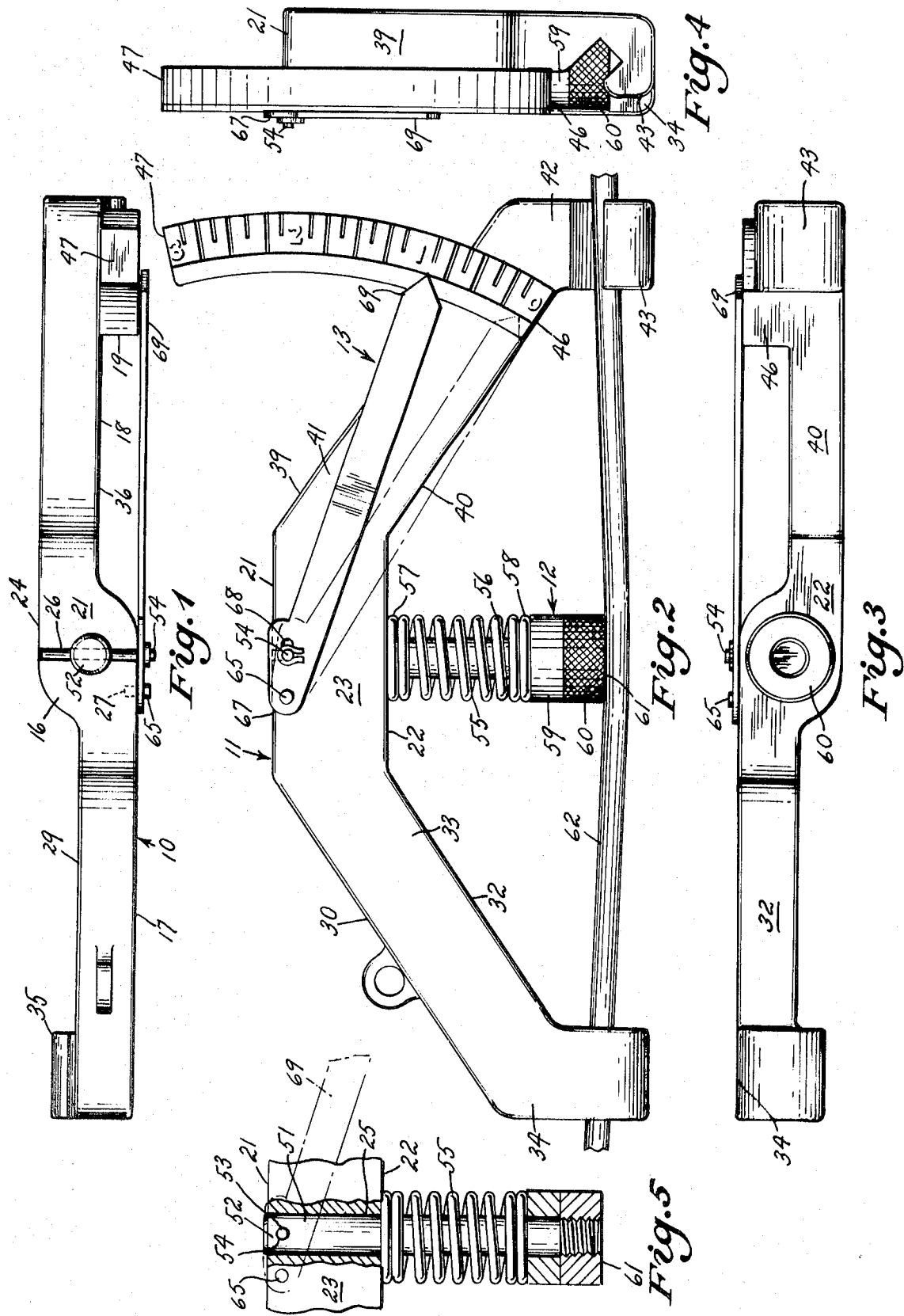

United States Patent Office 3,618,379
Patented Nov. 9, 1971

3,618,379
TENSIOMETER
Abraham Allen Lipton, Rock Ridge,
Mamaroneck, N.Y. 10543
Filed Oct. 31, 1969, Ser. No. 872,845
Int. Cl. G01l 5/06
U.S. Cl. 73—144
1 Claim

ABSTRACT OF THE DISCLOSURE

A device for comparing tension in stressed cables and wires including a frame element having first and second arms, the extremities of which engage a wire to be tested at a pair of spaced points along the wire, a central portion of the frame element supporting a resiliently urged plunger which selectively bears against a segment of the wire positioned between the arms, a scale fixed with respect to one of the arms, a pointer pivotally mounted on said frame element at one end thereof and having a free second end cooperating with the scale, pin means interconnecting movement of the plunger and the pointer, whereby the pointer may be used as a lever to position the plunger relative to said segment.

---

This invention relates generally to the field of tensiometers, which are specialized devices for measuring tension in a stressed cable or wire, and more particularly to an improved simplified form adapted for use on small sailboats and the like.

It is among the principal objects of the present invention to provide a relatively low cost device simplified in construction, and convenient for use by relatively unskilled persons.

Another object of the invention lies in the provision of an improved tensiometer which may be completely operated by the fingers of a single hand of a user, thereby permitting the user to steady himself with respect to the craft to which the cables or wires are attached.

Yet another object of the invention lies in the provision of an improved tensiometer having a resiliently urged plunger connected to a pointer, a free end of which traverses a scale, the construction being such that the position of the plunger may be adjusted by manually moving the pointer prior to the taking of a measurement.

Yet another object of the invention lies in the provision of an improved light weight but sturdy device having a relatively long trouble free useful service life.

A feature of the disclosed embodiment lies in the provision of loop means attached to a frame element, whereby the device may be carried by a user in convenient fashion.

These objects and features, as well as other incidental ends and advantages, will more fully appear in the progress of the following disclosure, and be pointed out in the appended claim.

In the drawing, to which reference will be made in the specification, similar reference characters have been employed to designate corresponding parts throughout the several views.

FIG. 1 is a top plan view of an embodiment of the invention.

FIG. 2 is a side elevational view thereof.

FIG. 3 is a bottom plan view thereof.

FIG. 4 is an end elevational view thereof as seen from the right hand portion of FIG. 2.

FIG. 5 is a fragmentary view in elevation, partly in section showing the centrally disposed portion of the frame element, and associated structure.

In accordance with the invention, the device, generally indicated by reference character 10, comprises broadly: a frame element 11, a plunger element 12 and a pointer element 13.

The frame element 11 is preferably formed of cast aluminium, whereby the device may have the jointly desirable properties of mechanical strength and light weight. It includes a centrally disposed socket-forming member 16 from which there extend first and second arm members 17 and 18, respectively. A scale member 19 is integrally cast with the first arm member, as best seen in FIG. 2 in the drawing.

The centrally disposed socket forming member 16 is bounded by an upper surface 21, a lower surface 22 and side surfaces 23 and 24. A centrally disposed bore 25 extends between the surfaces 21–22, and communicates with a transversely extending slot 26. An offset bore or socket 27 provides means for mounting the pointer element 13 for pivotal motion thereon.

The first arm member 17 is bounded by a side surface 29 and an upper surface 30, as well as a lower surface 32. An angularly disposed upper arm portion 33 communicates with a lower arm portion 34 having a cable-engaging member 35 thereon of generally rectangularly-shaped configuration (see FIG. 4). This configuration enables the cable or wire 62 being tested to be positioned in accurate alignment with respect to similar means on the second arm member 18, irrespective of the diameter of the wire.

The second arm member 18 is generally similar and symmetrically disposed, being bounded by a surface 36, an upper surface 39 and a lower surface 40. An upper arm portion 41 communicates with a lower arm portion 42 having a corresponding cable engaging member 43.

The scale member 19 is preferably integrally cast with respect to the first arm member 17, and includes a scale reading from a zero point at 46 to an upper limit at 47. The thickness of the scale member is such that the points 46 and 47 will lie in a plane parallel and adjacent the surface 23, as best seen in FIG. 1.

The plunger element 12 includes a cylindrical shaft 51 positioned within the bore 25, an inner end 52 of which is provided with a transverse bore 53 having a pin 54 which rides in the transversely extending slot 26, whereby the outward movement of the shaft is limited. The medial portion 55 thereof is surrounded by a coil spring 56 the inner end 57 of which abuts the surface 22, and the outer end 58 of which abuts a washer 59 and a threaded bushing 60. The outer surface 61 of the bushing bears against the wire 62 during operation.

The pointer element 13 is supported on a mounting pin 65 at a fixed end 67 thereof. An elongated slot 68 accommodates the pin 54 for the transmission of motion to the free end 69 which overlies the scale member 19.

During operation, the device is adjusted for varying diameters of cable by rotating the threaded bushing 60, whereby its position is shifted along the shaft 51. Following this, the device may be positioned on any desired cable or wire using only a single hand, by grasping the socket forming member 16 between the thumb and forefinger, and allowing the free end of the scale member to rest against the palm of the hand. This will position the remaining fingers of the hand above the exposed surface of the pointer element, so that the end of the plunger element may be withdrawn by a trigger like motion of these fingers. When the device has been positioned upon a wire 62, this last mentioned action is released, to bring the end of the plunger into contact with the wire, whereby it may be deformed to a degree dependent upon the tension in the spring 56. It will be observed that the tension of this spring may be varied by removal of the washer 59 in the case of relatively thin wires or cables, so as to obtain a suitable reading on scale irrespective of the effective diameter of the wire or cable.

In the case of checking the tension on small boat rigging, the absolute value of tension is of relatively less importance than the obtaining of substantially equal tension on oppositely disposed guy wires. Thus, the device need only be adjusted to a point where an easily determined reading on scale is obtained with the wires on one side of the craft, and the wires themselves adjusted by turnbuckles to obtain equivalent readings on wires located on the other side of the craft. However, owing to the presence of plural equally spaced graduations on the scale member, with proper adjustment with respect to a standardized reference, the scale member may also be used to read positive values.

I wish it to be understood that I do not consider the invention limited to the precise details of structure shown and set forth in this specification, for obvious modifications will occur to those skilled in the art to which the invention pertains.

I claim:

1. A tensiometer for measuring tension in a stressed cable comprising: a frame element including a centrally disposed portion and a pair of arms having means engaging a cable to be tested at a pair of spaced points therealong, said centrally disposed portion having a bore therein; a plunger positioned within said bore, and having a free end selectively contacting a segment of cable disposed between said arms; resilient means interposed between said frame element and the free end of said plunger; an arcuately shaped scale fixedly mounted at one end thereof to said frame element and extending outwardly therefrom in the plane thereof; a pointer pivotally mounted at one end thereof on said frame element, and having a free end cooperating with said scale; and motion transmitting means interconnecting said plunger and pointer; said pointer overlying said frame element and the attached end of said scale when said resilient means is significantly unstressed and being clear of said frame element when said resilient means is significantly stressed, whereby manual grasping of said pointer for the transmission of motion to said plunger is facilitated.

References Cited

UNITED STATES PATENTS

| 1,031,208 | 7/1912 | Thompson | 73—144 |
| 2,618,153 | 11/1952 | McKernan | 73—144 |
| 3,174,334 | 3/1965 | McKernan | 73—144 |

FOREIGN PATENTS

| 82,515 | 8/1895 | Germany | 73—144 |

CHARLES A. RUEHL, Primary Examiner